UNITED STATES PATENT OFFICE.

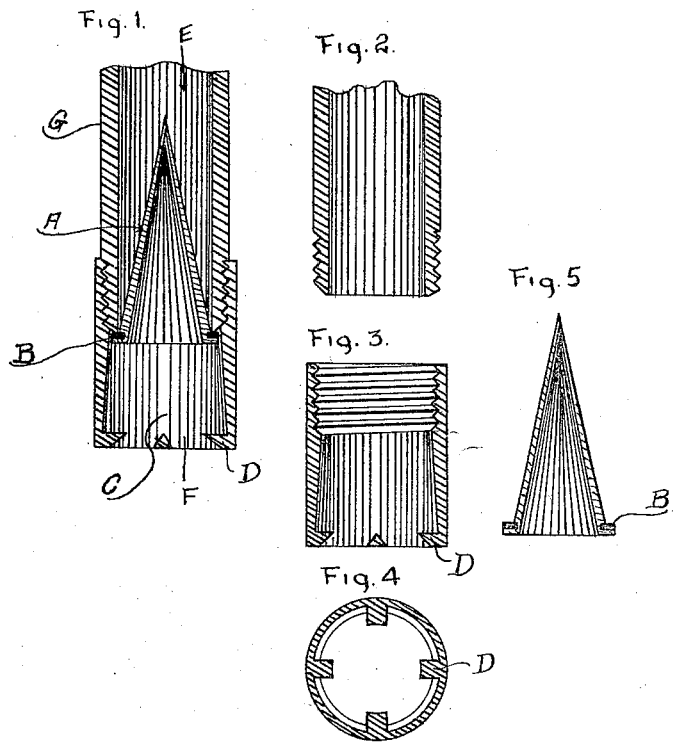

PATRICIO VILLAREAL, OF LAREDO, TEXAS.

VALVE.

1,181,271.   Specification of Letters Patent.   Patented May 2, 1916.

Application filed August 2, 1915. Serial No. 43,142.

*To all whom it may concern:*

Be it known that I, PATRICIO VILLAREAL, a citizen of the United States, residing in Laredo, in the county of Webb, State of Texas, have invented a new and useful Valve, of which the following is a specification.

My invention relates to improvements in valves for air, steam, water, or other liquids, and the objects of my improvements are first, to provide a more durable valve than the present ones now in use, second to eliminate the use of tension springs, and third, to facilitate the application of valves. I attain these objects by the valve shown in the accompanying drawing, in which, similar letters refer to similar parts shown in views.

Figure 1 shows a sectional view of the assembled valve. Fig. 2, shows a sectional view of a piece of pipe threaded, and which is "G" in Fig. 1. Fig. 3 shows a sectional view of a tapered cylindrical valve chamber which is "C" in Fig. 1. Fig. 4 shows an end view of Fig. 3. Fig. 5 shows a sectional view of a hollow cone valve shown as "A" in Fig. 1 and carrying a ring "B" as valve face shown in Fig. 1.

The valve "A" is a hollow cone with washer "B" and cylinder "C" which holds the valve in its upward and downward movement, with projections "D" which hold the valve when open.

In operation, liquid enters at "E" and when the pressure is released at "E" then the pressure from "F" coming against the inside of the cone seats the valve and arrests the backflow.

The pressure in the cone being away from the valve will cause the valve to seat more readily, than it does on a flat check valve, and eliminates chattering.

I claim:

A check valve comprising a cone having at its base oppositely disposed seating faces adapted to contact successively with oppositely disposed plane seats.

PATRICIO VILLAREAL.

Witnesses:
A. R. VILLAREAL,
SAM T. FOSTER, Jr.

Copies of this patent may be obtained for five cents each, by addressing the "Commissioner of Patents, Washington, D. C."